(12) United States Patent
Gupta et al.

(10) Patent No.: US 10,606,776 B2
(45) Date of Patent: Mar. 31, 2020

(54) ADDING DUMMY REQUESTS TO A SUBMISSION QUEUE TO MANAGE PROCESSING QUEUED REQUESTS ACCORDING TO PRIORITIES OF THE QUEUED REQUESTS

(71) Applicant: INTERNATIONAL BUSINESS MACHINES CORPORATION, Armonk, NY (US)

(72) Inventors: Lokesh M. Gupta, Tucson, AZ (US); Matthew G. Borlick, Tucson, AZ (US); Kevin J. Ash, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 56 days.

(21) Appl. No.: 15/954,325

(22) Filed: Apr. 16, 2018

(65) Prior Publication Data
US 2019/0317909 A1    Oct. 17, 2019

(51) Int. Cl.
*G06F 13/38* (2006.01)
*G06F 13/18* (2006.01)
(Continued)

(52) U.S. Cl.
CPC .......... *G06F 13/18* (2013.01); *G06F 12/0842* (2013.01); *G06F 13/1668* (2013.01);
(Continued)

(58) Field of Classification Search
CPC ...................................................... G06F 13/38
See application file for complete search history.

(56) References Cited

U.S. PATENT DOCUMENTS 5,922,057 A    7/1999    Holt
6,385,683 B1    5/2002    DeKoning et al.
(Continued)

FOREIGN PATENT DOCUMENTS

EP    1452967    9/2004
EP    1188119    12/2009
(Continued)

OTHER PUBLICATIONS

Agarwal, N., et al., "Design Tradeoffs for SSD Performance", [online], translated on Apr. 25, 2008, [Retrieved on Jan. 21, 2018], Retrieved from the Internet at URL: <https://www.usenix.org/legacy/event/usenix08/tech/full_papers/agrawa . . . , 22 pp.
(Continued)

*Primary Examiner* — Cheng Yuan Tseng
(74) *Attorney, Agent, or Firm* — David W. Victor; Konrad Raynes Davda & Victor LLP

(57) ABSTRACT

Provided are a computer program product, system, and method for adding dummy requests to a submission queue to manage processing of queued requests according to priorities of the queued requests. A determination is made of a priority for a request to stage a track from the storage device to the cache or to destage a track from the cache to the storage device, comprising a first priority or a second priority. The first priority is higher than the second priority. At least one dummy request is added to a queue in response to the request having the second priority. The controller upon processing a dummy request in the queue discards the dummy request without performing an operation with respect to the storage device. An I/O request having the second priority is added to the queue. The controller processes the I/O request to stage or destage data.

17 Claims, 7 Drawing Sheets

(51) Int. Cl.
*G06F 12/0842* (2016.01)
*G06F 13/16* (2006.01)

(52) U.S. Cl.
CPC ............... *G06F 2212/1024* (2013.01); *G06F 2213/0026* (2013.01)

(56) References Cited

U.S. PATENT DOCUMENTS

| | | | |
|---|---|---|---|
| 8,108,573 B2* | 1/2012 | Lehr | G06F 9/5027 710/39 |
| 8,719,645 B2 | 5/2014 | Chiu et al. | |
| 8,762,609 B1 | 6/2014 | Lam et al. | |
| 9,116,858 B1 | 8/2015 | Yokoi et al. | |
| 9,304,689 B2 | 4/2016 | Guo et al. | |
| 9,542,344 B2 | 1/2017 | Tuers et al. | |
| 9,563,382 B2 | 2/2017 | Hahn et al. | |
| 9,720,601 B2 | 8/2017 | Gupta et al. | |
| 2003/0016596 A1 | 1/2003 | Chiquoine et al. | |
| 2015/0286419 A1 | 10/2015 | Guo et al. | |
| 2017/0103016 A1 | 4/2017 | Stalzer | |
| 2017/0139594 A1 | 5/2017 | Afin et al. | |
| 2017/0139825 A1 | 5/2017 | Dubeyko et al. | |
| 2018/0011527 A1 | 1/2018 | Kim | |

FOREIGN PATENT DOCUMENTS

| | | |
|---|---|---|
| WO | 2017081593 | 5/2017 |
| WO | 2018004836 | 1/2018 |

OTHER PUBLICATIONS

Cobb, D., "NVM Express and the PCI Express SSD Revolution", Intel Developer Form 2012, © 2012 Intel Corporation, 48 pp.
Evans, C., "Does NVMe Signal the End of the Storage Controller?", [online], Aug. 15, 2017, [Retrieved on Mar. 19, 2018], Retrieved from the Internet at URL: <http://www.computerweekly.com/feature/Does-NVMe-signal-the-end-of-t . . . >, 2 pp.
Marks, K., "An NVM Express Tutorial", Flash Memory Summit 2013, 92 pp.
Disclosed Anonymously, "Method for Enhanced Application Performance and Improved Loadbalancing Considerations in Multi-tier Storage Environment", IP.Com No. IPCOM000250728D, Aug. 29, 2017, 7 pp.
Metz, J., "Under the Hood with NVMe Over Fabrics", Interop Expo Las Vegas, May 2016, 44 pp.
NVM Express, "NVM Express", Revision 1.3a, Oct. 24, 2017, 287 pp.
NVM Express, "NVM Product Overview", [online], © 2018 NVM Express, Inc., [Retrieved on Mar. 19, 2018], Retrieved from the Internet at URL: <https://nvmexpress.org/about/nvm-express-overview/>, 2 pp.
Son, Y., et al., "An Empirical Evaluation of NVM Express SSD", 2015 International Conference on Cloud and Autonomic Computing, 8 pp.
Zhang, G., et al., "Adaptive Data Migration in Multi-tiered Storage Based Cloud Environment", 2010 IEEE 3rd International Conference on Cloud Computing, 8 pp.

\* cited by examiner

ADDING DUMMY REQUESTS TO A SUBMISSION QUEUE TO MANAGE PROCESSING QUEUED REQUESTS ACCORDING TO PRIORITIES OF THE QUEUED REQUESTS

BACKGROUND OF THE INVENTION

1. Field of the Invention

The present invention relates to a computer program product, system, and method for adding dummy requests to a submission queue to manage processing of queued requests according to priorities of the queued requests.

2. Description of the Related Art

A storage controller maintains one or more device adaptors to interface with an array of storages devices, such as storage devices a Redundant Array of Independent Disks (RAID) array. The device adaptors manage requests to the connected storage devices and will implement the RAID controller and functions. In Nonvolatile Memory Express (NVMe), NVMe controllers may access read and write requests to the storage devices in submission queues in a host system and include RAID functionality to stripe data across storage devices, such as Solid State Drives (SSDs).

There is a need in the art for improved technologies for writing and reading data using a controller that accesses the requests from the submission queues.

SUMMARY

Provided are a computer program product, system, and method for adding dummy requests to a submission queue to manage processing of queued requests according to priorities of the queued requests. A determination is made of a priority for a request to stage a track from the storage device to the cache or to destage a track from the cache to the storage device. The priority comprises a first priority or a second priority. The first priority is higher than the second priority. At least one dummy request is added to a queue in response to the request having the second priority. The controller upon processing a dummy request in the queue discards the dummy request without performing an operation with respect to the storage device. An I/O request having the second priority is added to the queue. The controller upon processing the I/O request stages or destages data between the cache and the storage device.

DETAILED DESCRIPTION

Described embodiments provide improvements to computer technology to manage the priority of processing of I/O requests in a submission queue by a controller to stage and destage data between storage devices and a cache. Described embodiments utilize a dummy request data structure to add to the submission queue when adding a destage or stage request to the submission queue having a lower relative priority. Dummy requests may be added to the submission queue for higher relative priority levels than the priority of the stage/destage request being processed to function as placeholders in the queue for subsequent stage/destage requests having higher priority. If a request having a higher priority is subsequently received after adding the dummy requests, then the higher priority I/O request may replace one of the dummy requests in the queue to allow processing of that relatively higher priority request before the relatively lower priority request is processed that was previously added to the submission queue after the dummy requests for the higher priority level. This allows the storage controller to manage the priority at which a separate controller device processes I/O requests by including dummy request placeholders to be used to add higher priority requests to the queue ahead of lower priority requests.

Further, described embodiments provide improved technology to allow a storage controller to manage the order in which a separate controller element, such as an NVMe controller, processes I/O requests in the queue by using dummy requests in the queue that do not require coordination with the controller. The controller may continue to process the submission queue without having to have additional logic for managing the priority, because the host system uses the dummy request placeholders to allow a new higher priority request to be added to the submission queue above lower priority requests. The controller may discard dummy requests from the queue when accessing without performing any read/write with respect to the storage devices. Further described embodiments, allow the storage controller to adjust the order in which the controller processes the submission queues by allowing higher priority requests to be advanced to a higher position in the queue above lower priority requests to ensure that the separate controller, such as an NVMe controller, processes requests according to a priority ordering managed by the storage controller or host without having to manage the priority ordering internally to improve the efficiency of the controller processing operations.

The described embodiments provide improvements in priority queue management technology in environments were a separate controller manages reads and writes between the cache and the storage devices.

Figure 1:
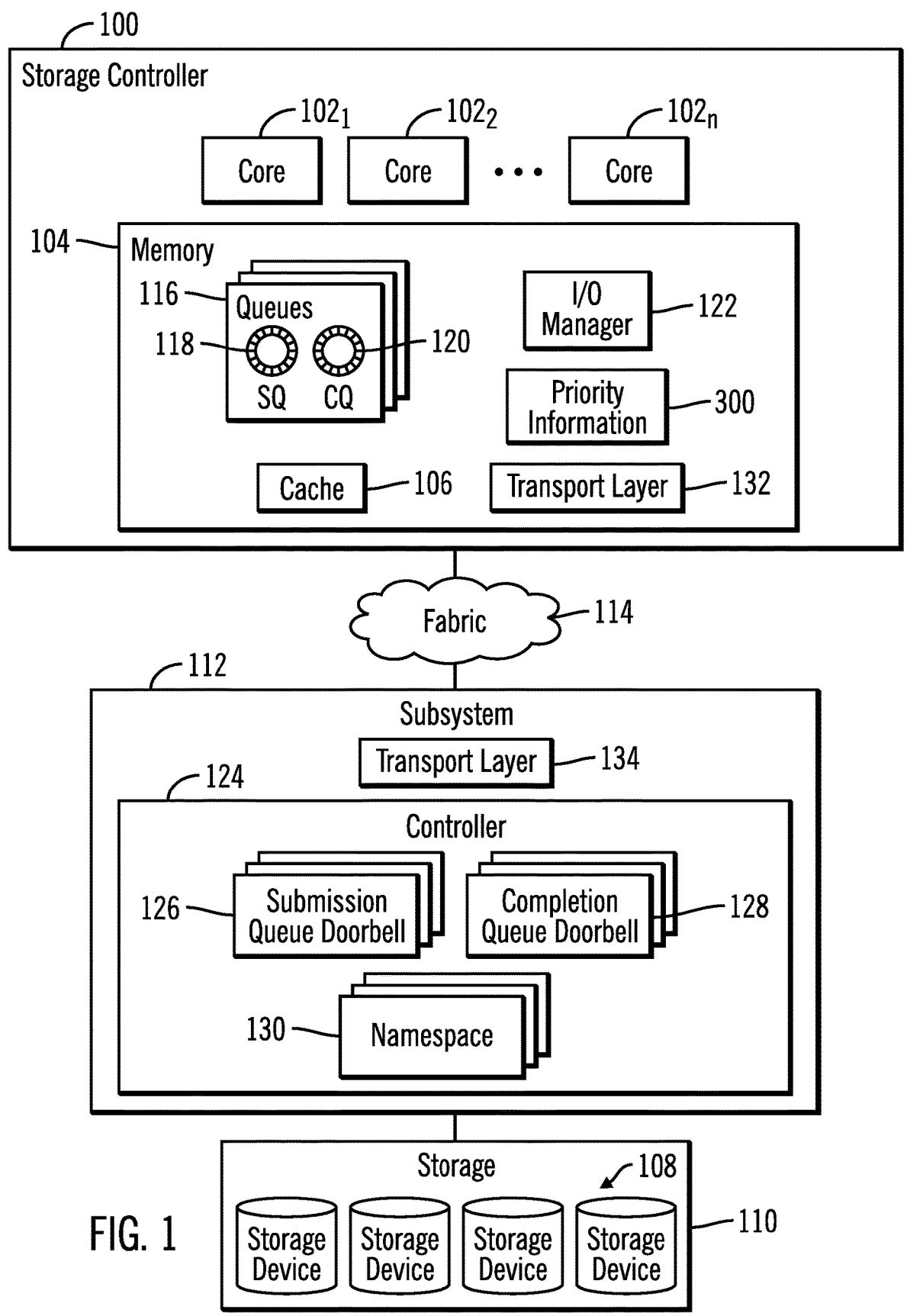
FIG. 1 illustrates an embodiment of a storage controller.

FIG. 1 illustrates an embodiment of a storage controller 100, or other type of system, including a plurality of cores $102_1, 102_2 \ldots 102_n$ and a memory 104 including a cache 106 to cache tracks staged from storage devices 108 in a storage array 110 to make available to read requests. The storage controller 100 is in communication with a subsystem 112 over a fabric 114, where read and write requests to the storage devices 108 are managed by the subsystem 112. The memory 104 includes queues 116, one for each of the cores $102_1, 102_2 \ldots 102_n$, where the queues 116 for each core include one or more submission queues (SQs) 118 to which read and write requests are added and a completion queue 120 (CQ). The queues 118, 120 may comprise circular queues each having a head pointer pointing to an end of the queue from which requests are accessed when the queue is processed and a tail pointer having pointing to an end of the queue to which requests are added. A core $102_1$ executes an I/O manager 122 to add requests to the submission queues 118 for the core $102_1$ to stage tracks from the storage devices 108 to the cache 106 and destage tracks from the cache 106 to the storage devices 108. The I/O manager 122 maintains priority information 300 to manage requests in the submission queues 118.

A controller 124 in the subsystem 112 retrieves read and write requests to the storage devices 108 added to the submission queues 118 by the I/O manager 122 when the I/O manager 122 writes to a submission queue doorbell 126 in the controller 124. In response to completing the retrieved read (stage) or write (destage) request with respect to the cache 106 and storage devices 108, the controller 124 returns complete for the read or write request to the completion queue 120, which informs the core $102_1$, $102_2$ . . . $102_n$ initiating the read or write request of the completion. The core $102_1$, executing the I/O manager 122, may write to a completion queue doorbell 128 to indicate completing processing the completion written to the completion queue 116 to coordinate the completion.

In Non-Volatile Memory Express (NVMe) embodiments, the controller 124 may comprise an NVMe controller and the I/O manager 122 may include NVMe drivers to interface with the NVMe controller 124, and implement the queues 116. The NVMe controller 124 may include submission queue doorbells 126, one for each of the submission queues used by a core $102_1$, and a completion queue doorbell 128. The core $102_1$ adding the request to its submission queue 118 writes to the controller 124 submission queue doorbell 126 to cause the controller 124 to access the read or write request added to the submission queue 118 associated with the written submission queue doorbell 126. The controller 124 may execute the fetched commands in any order. When the core $102_1$, $102_2$ . . . $102_n$ processes a completion of a read/write request indicated in the completion queue 120, the core $102_1$, $102_2$ . . . $102_n$ writes to the completion queue doorbell 128 for the completion queue 120. The controller 124 may support multiple namespaces 130 that comprise portions of non-volatile memory spaces implemented in the storage devices 108. The storage controller 100 may direct read and write requests to the namespaces 130 that map to non-volatile memory space in the storage devices 108. The storage devices 108 would further include hardware and software to interface with the NVMe controller 124.

The embodiment of FIG. 1 may implement NVMe over Fabrics, where the storage controller 100 and subsystem 112 communicate over a fabric 114. In such embodiments, the storage controller 100 and NVMe subsystem 112 include transport layers 132, 134 respectively to enable network communication, such as using Remote Direct Memory Access (RDMA), RDMA over Converged Ethernet (RoCE), Internet Wide-area RDMA Protocol (iWARP), InfiniBand, and Fibre Channel. In an alternative embodiment, the subsystem 112, such as an NVME subsystem 112, may be implemented in a Peripheral Component Interconnect Express (PCIe) card in the storage controller 100, and the storage controller 100 and NVMe subsystem 112 communicate over a PCIe interface.

The storage controller 100 maintains Input/Output (I/O) manager code 122, executed by the cores $102_1$, $102_2$ . . . $102_n$, to stage and destage tracks between the storage devices 108 and the cache 106. The I/O manager code 122 may further implement Redundant Array of Independent Disk (RAID) algorithms, or other types of storage array management algorithms, to stripe tracks in stride groups onto the storage devices 108 and calculate parity for the tracks in a stride group to stripe with the tracks across the storage devices 108.

The cores $102_1$, $102_2$ . . . $102_n$ may comprise multiple cores on a same central processing unit (CPU)/integrated circuit substrate, or comprise separate processing units. Each core $102_1$, $102_2$ . . . $102_n$ may execute the I/O manager 122 code to submit read and writes to tracks configured in strides in the storage devices 108 that are maintained in cache 106 to stage tracks from the storage devices 108 and destage stride groups of tracks from the cache 106 to stripe across the storage devices.

The I/O manager 122 may maintain a track index providing an index of tracks in the cache 106 to cache control blocks in a control block directory. The control block directory includes cache control blocks, where there is one cache control block for each track in the cache 106 providing metadata on the track in the cache, such as stride group information on the stride group in which the track is maintained. The track index associates tracks with the cache control blocks providing information on the tracks in the cache 106.

The storage controller 100 may comprise a storage system, such as the International Business Machines Corporation (IBM®) DS8000® and DS8880 storage systems, or storage controllers and storage systems from other vendors. (IBM and DS8000 are trademarks of International Business Machines Corporation throughout the world).

The storage devices 108 in the storage array 110 may comprise different types or classes of storage devices, such as magnetic hard disk drives, magnetic tape storage, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. Volumes in a storage space may further be configured from an array of devices, such as Just a Bunch of Disks (JBOD), Direct Access Storage Device (DASD), Redundant Array of Independent Disks (RAID) array, virtualization device, etc. Further, the storage devices 108 in the storage array 110 may comprise heterogeneous storage devices from different vendors and different types of storage devices, such as a first type of storage devices, e.g., hard disk drives, that have a slower data transfer rate than a second type of storage devices, e.g., SSDs.

In NVMe implementations, the storage devices 108 would include NVMe components to interface with the NVMe subsystem 112, such as NVMe SSD devices.

The memory 104 may comprise a suitable system memory known in the art, including volatile and non-volatile memory devices, such as a Dynamic Random Access Memory (DRAM), a phase change memory (PCM), Magnetoresistive random-access memory (MRAM), Spin Transfer Torque (STT)-MRAM, SRAM storage devices, DRAM, a ferroelectric random-access memory (FeTRAM), nanowire-based non-volatile memory, and a Non-Volatile Direct In-Line Memory Modules (DIMMs) with byte-addressable write-in-place memory, etc.

Figure 2:
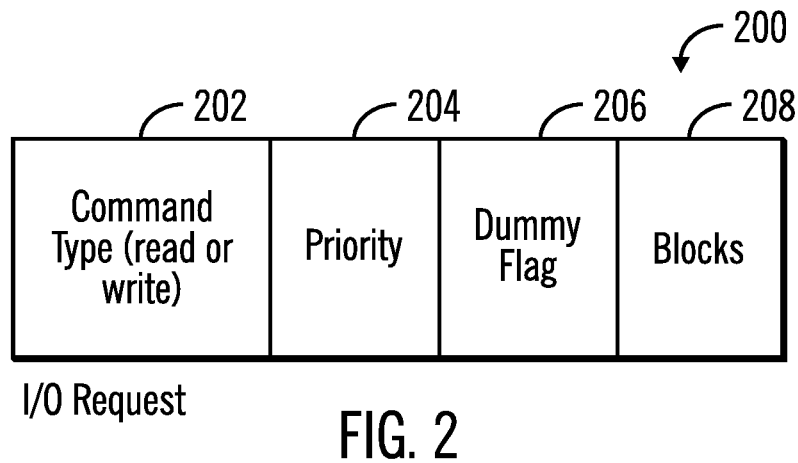
FIG. 2 illustrates an embodiment of an Input/Output (I/O) request.

FIG. 2 illustrates an embodiment of an I/O request 200 added to a submission queue 118 to stage a track from storage devices 108 into the cache 106 or to destage a track from the cache 106 to the storage devices 108. Tracks may be striped across the storage devices 108. The I/O request 200 includes a command type 202, such as read or write; a priority 204, such as a high priority request that must be processed at a highest priority, a medium priority request, and low priority, and other priorities therebetween; a dummy flag 206 indicating whether the request 200 comprises a dummy request that does not specify to destage or stage data with respect to the storage devices 108; and blocks or tracks 208 to write to the storage devices 108.

Figure 3:
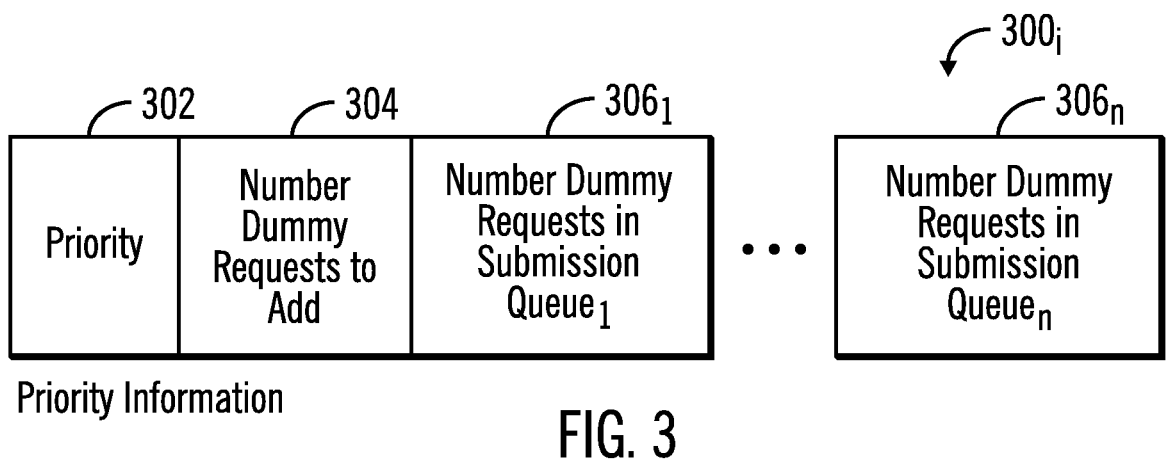
FIG. 3 illustrates an embodiment of priority information having information on queued requests for a priority level.

FIG. 3 illustrates an instance of priority information $300_i$ maintained for a priority, such as high, medium, low, etc., and includes a priority value 302; a number of dummy requests 304 to add to the submission queue 118 for priority 302; and a number of dummy requests in a submission queue $306_1 \ldots 306_n$ to indicate the number of dummy requests in each of the submission queues 118.

Figure 4:
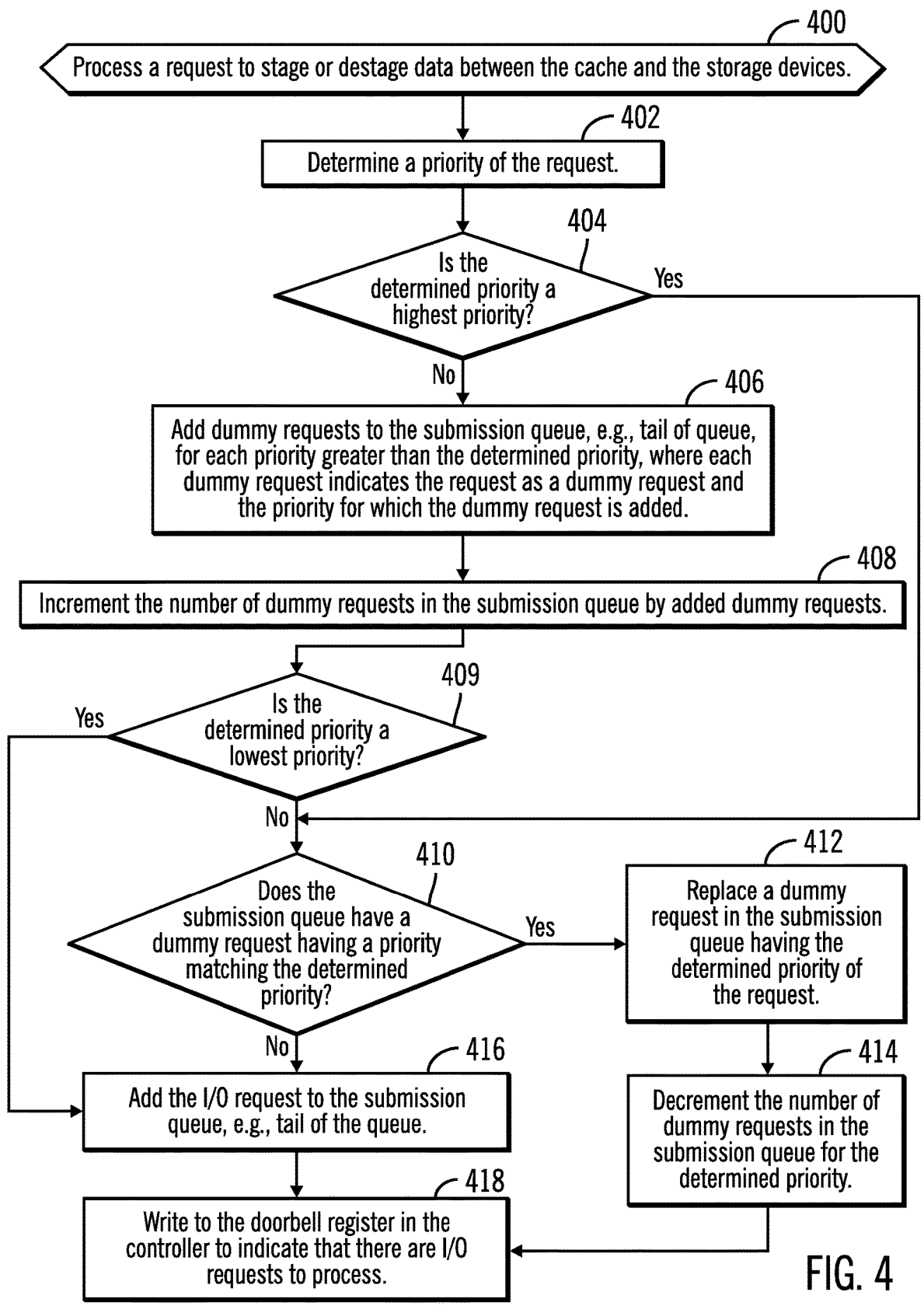
FIG. 4 illustrates an embodiment of operations to process a request to stage or destage data between a cache and storage devices.

FIG. 4 illustrates an embodiment of operations performed by the I/O manager 122, executed by a core $102_i$, to queue in a submission queue 118 a request to destage a track from the cache 106 to the storage devices 108 or stage a track from the storage devices 108 to the cache 106. Upon processing a request to destage or stage a track, the I/O manager 122 determines (at block 402) a priority of the request. The priority may be included in the request or it may be determined from the data, such as the location in the storage devices 108 at which the data is stored or a type of data or the application generating the data to stage or destage. If (at block 404) the determined priority is not a highest priority, then the I/O manager 122 adds (at block 406) one or more dummy requests $200_D$ to the submission queue 118, e.g., tail of the queue, associated with the core $102_i$ executing the I/O manager 122, for each priority greater than the determined priority. Each dummy request $200_D$ indicates the request as a dummy request, such as indicated in the dummy flag 206, and the priority 204 for which the dummy request $200_D$ is added. The number of dummy requests in the submission queue $306_j$, for submission queue $118_j$, to which the dummy requests $200_D$ are added is incremented (at block 408) by the number of added dummy requests $200_D$.

If (at block 409) the determined priority is not the lowest priority or if (at block 404) the priority is the highest priority, then the I/O manager 122 determines (at block 410) whether the submission queue 118 has a dummy request $200_D$ having a priority 204 matching the determined priority of the stage/destage request. If so, then the I/O manager 122 replaces (at block 412) a dummy request in the submission queue 118, i.e., oldest dummy request closest to the head end, having the determined priority of the stage/destage request. The number of dummy requests in the submission queue $306_j$ is decremented (at block 414) for the replaced dummy request $200_D$ for the determined priority.

If (at block 409) the determined priority is the lowest priority or if (at block 410) the submission queue 118 does not have a dummy request $200_D$ having a priority 204 matching the determined priority, then the I/O manager 122 adds (at block 416) the I/O request 200 to the submission queue, e.g., tail of the queue, indicating the command type 202, e.g., read (stage) or write (destage), the determined priority 204, the dummy flag 206 indicating the request 200 is not a dummy request, and the blocks or tracks 208, or other data unit, subject to the request. After adding the I/O request 200 (at block 416) or replacing a dummy request $200_D$ (at block 414) to the submission queue 118, the I/O manager 122 writes (at block 418) to the doorbell register 126 in the submission queue doorbell 126 in the controller 124 to indicate that there are I/O requests to process.

With the embodiments of FIG. 4, dummy requests are added to the queue when the priority of the request being processed is the lowest priority before adding the I/O request for the lower priority stage or destage request to create placeholders in the queue for subsequent higher priority requests to be placed in the queue above the queued lower priority request to provide higher priority processing to the higher priority requests over the lower priority requests. In this way, described embodiments provide improvements to computer technology for queueing I/O requests to ensure that higher priority requests receive priority in processing in the queue to satisfy the priority goals of the requests.

Figure 5:
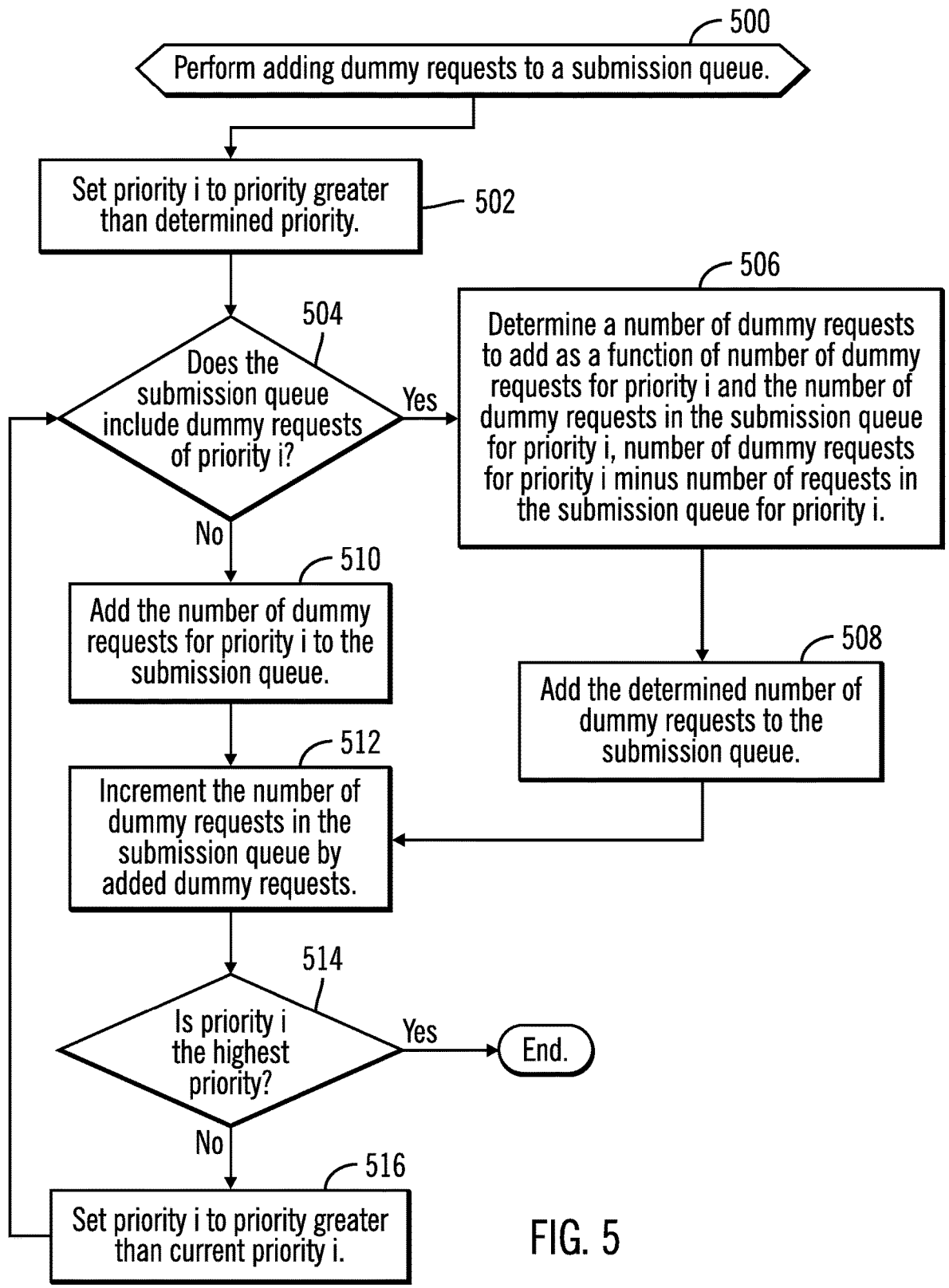
FIG. 5 illustrates an embodiment of operations to add dummy requests to a submission queue.

FIG. 5 illustrates a further embodiment of operations performed by the I/O manager 122 to add dummy requests $200_D$ to a submission queue 118, such as could be performed at block 406 in FIG. 4. The embodiment of operations of FIG. 5 may be performed when there are more than two priorities. Upon performing an operation (at block 500) to add dummy requests to a submission queue 118, the I/O manager 122 sets (at block 502) priority i to a priority level immediately greater than the determined priority. If (at block 504) the submission queue 118 includes dummy requests of priority i, then the I/O manager 122 determines (at block 506) a number of dummy requests $200_D$ to add as a function of a number of dummy requests 304 for priority i in the priority information $300_i$ for priority i and the number of dummy requests in the submission queue $306_j$ for priority i and submission queue $118_j$. For instance, in one embodiment, the determined dummy requests to add may comprise a number of dummy requests 304 for priority i minus a number of requests in the submission queue $306_j$ for priority i and submission queue $118_j$. Other functions may be used based on the number of dummy requests already in the queue and the maximum number to add if no dummy requests are in the queue for priority i. The I/O manager 122 adds (at block 508) the determined number of dummy requests $200_D$ to the submission queue 118.

If (at block 504) the submission queue 118 does not include any dummy requests for priority i, such as indicated in the field $306_j$ for the submission queue $118_j$, then the I/O manager 122 adds (at block 510) the number of dummy requests 304 for priority i to the submission queue 118. From blocks 508 or 510, the number of dummy requests in the submission queue $306_j$ is incremented (at block 512) by the added dummy requests $200_D$. If (at block 514) the priority i is not the highest priority, the priority i is set (at block 516) to a priority level greater than the current priority i and control proceeds back to block 504 to add dummy requests for the next priority level. If (at block 514) the priority i is the highest priority, then control ends.

With the embodiments of FIG. 5, if there are more than two priority levels, then different number of dummy requests are added to the submission queue 118 for different priority levels greater than the priority level for which the stage/destage request is received so as to provide more dummy requests for higher priority levels than lower priority levels greater than a lowest priority levels. In this way, more opportunities for advancing relatively higher priority requests over relatively lower priority requests in the submission queue are provided to ensure that the relatively higher priority requests are processed first. Further, if there are already dummy requests in the queue for a priority, then the number of dummy requests to add are reduced by the current number of dummy requests in the queue to ensure that lower priority requests in the queue are not starved or do not experience undue delays in being processed by continually adding more dummy requests ahead of the lower priority request. In this way, the number of dummy requests added for higher priority requests is tempered as the queue becomes filled with dummy requests for that higher priority.

Figure 6:
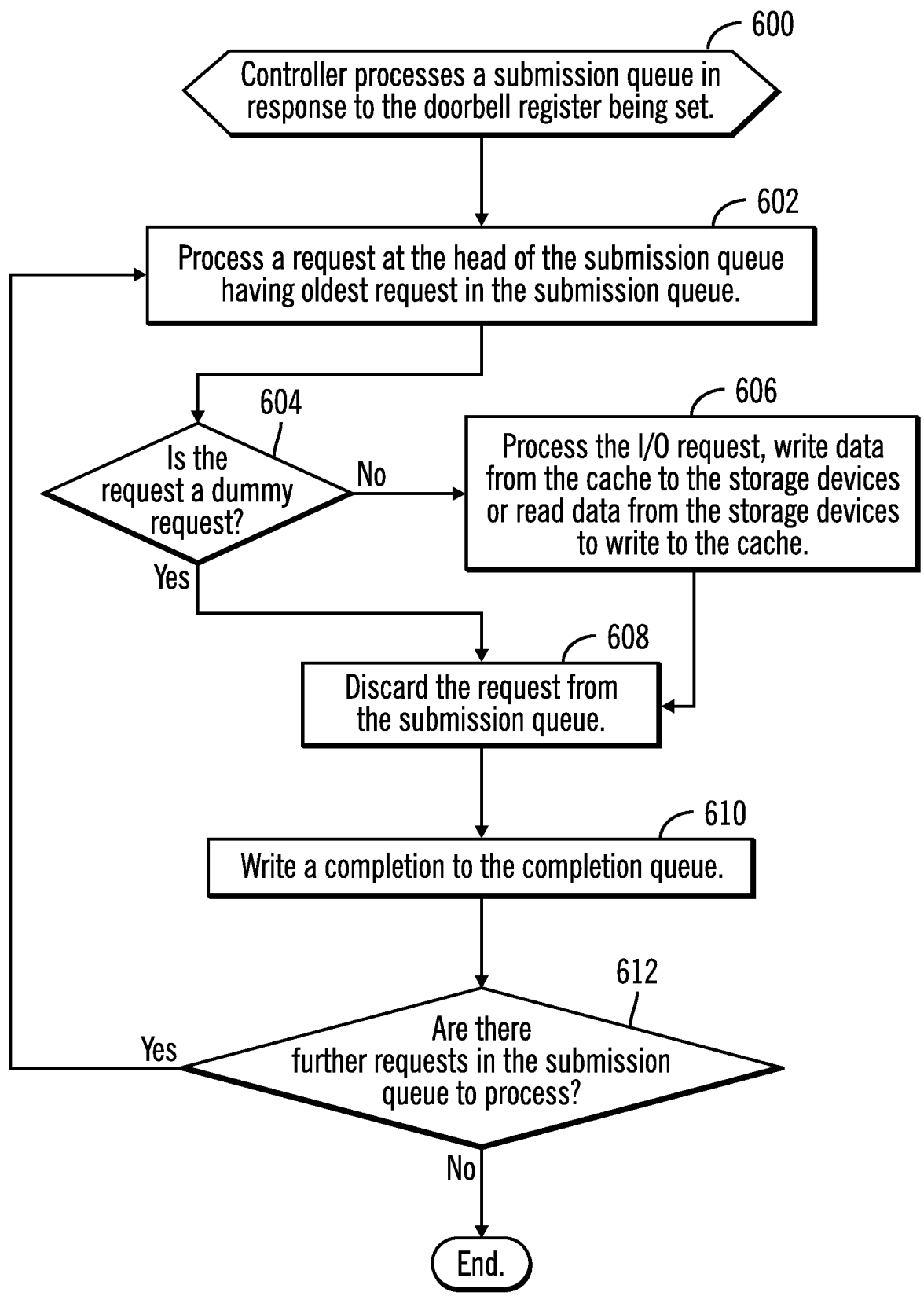
FIG. 6 illustrates an embodiment of operations to process a submission queue.

FIG. 6 illustrates an embodiment of operations performed by the controller 124 to process I/O requests 200 in the submission queues 118. The controller 124 initiates (at block 600) processing of I/O requests 200 in a submission queue 118 in response to the submission queue doorbell 126 being set. The controller 124 processes (at block 602) an oldest request 200 in the submission queue 118 at the head pointer. If (at block 604) the request 200 is not a dummy request, such as the dummy flag 206 is not set, then the controller 124 processes (at block 606) the I/O request 200, such as write data from the cache 106 to the storage devices 108 or read data from the storage devices 108 to write to the cache 106.

If (at block 604) the request is a dummy request $200_D$ or after processing the I/O request 200 not comprising a dummy request (at block 606), then the processed request 200 is discarded (at block 608) from the submission queue 118. The controller 124 then writes (at block 610) completion to the completion queue 120 indicating the processing of the queued I/O request 200 was completed. If (at block 612) there are further I/O requests in the submission queue 118 to process, then control proceeds back to block 602 to continue processing requests in the submission queue 118. If (at block 612) there are no further I/O requests 200 in the submission queue 120, then control ends.

With the embodiment of FIG. 6, the controller 124 discards the processed dummy requests $200_D$ to remove from the submission queue 118 if the dummy request $200_D$ has not yet been replaced by an incoming stage/destage request at the priority 204 of the dummy request $200_D$.

Figure 7:
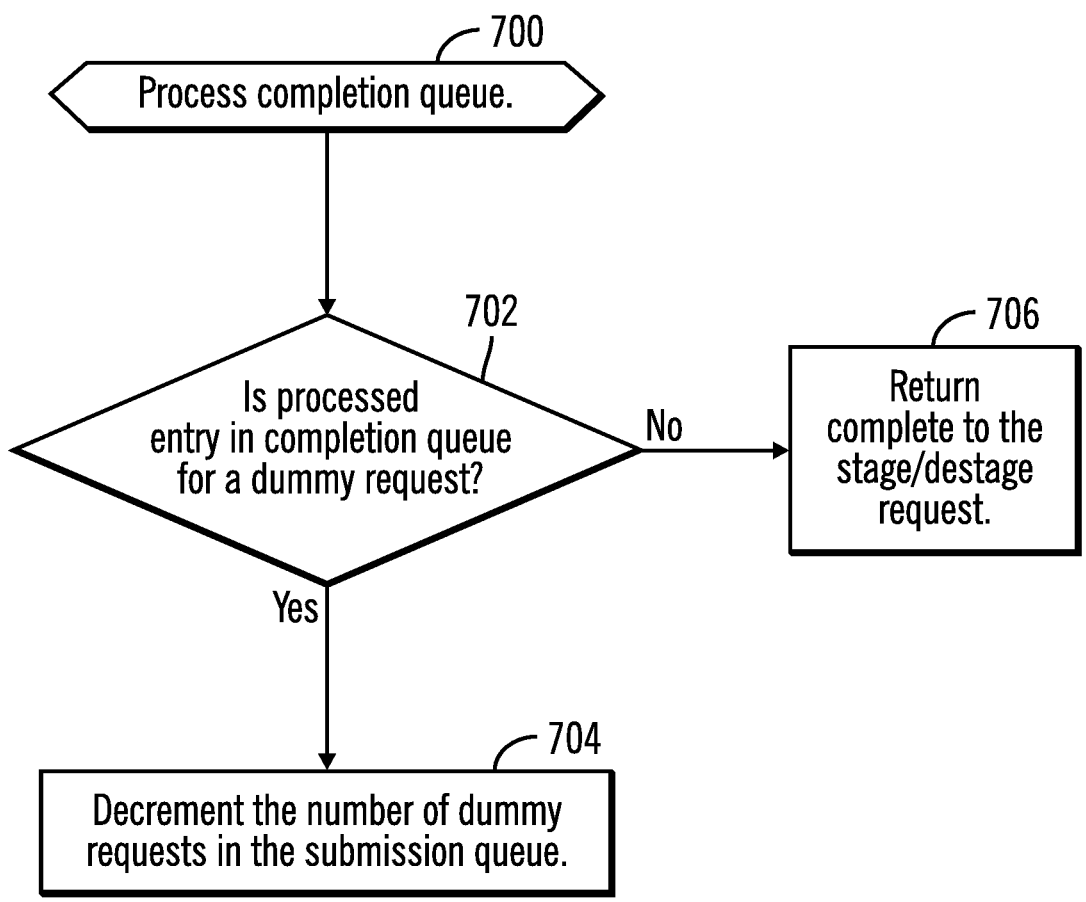
FIG. 7 illustrates an embodiment of operations to process a completion queue.

FIG. 7 illustrates an embodiment of operations performed by the I/O manager 122 to process the completion queue 120 for one of the cores $102_i$ to complete the processing for an I/O request 200. If (at block 702) the processed entry in the completion queue 120 is for a dummy request $200_D$, then the number of dummy requests in the submission queue $306_j$, for the priority $300_i$ and submission queue $118_j$, indicated in the entry in the completion queue 120 is decremented (at block 704). If (at block 702) the processed entry in the submission queue 120 is not for a dummy request, then complete is returned to the stage/destage request processed in the completion queue 120.

With the embodiment of FIG. 7, the I/O manager 122 manages the number of dummy requests in the submission queue $306_j$, which may be used to determine the number of dummy requests to add to a submission queue $118_j$ for priority i, by decrementing the number $306_j$ when determining that the controller 124 has removed the dummy request $200_D$ for that priority level from the submission queue 118.

The present invention may be implemented as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
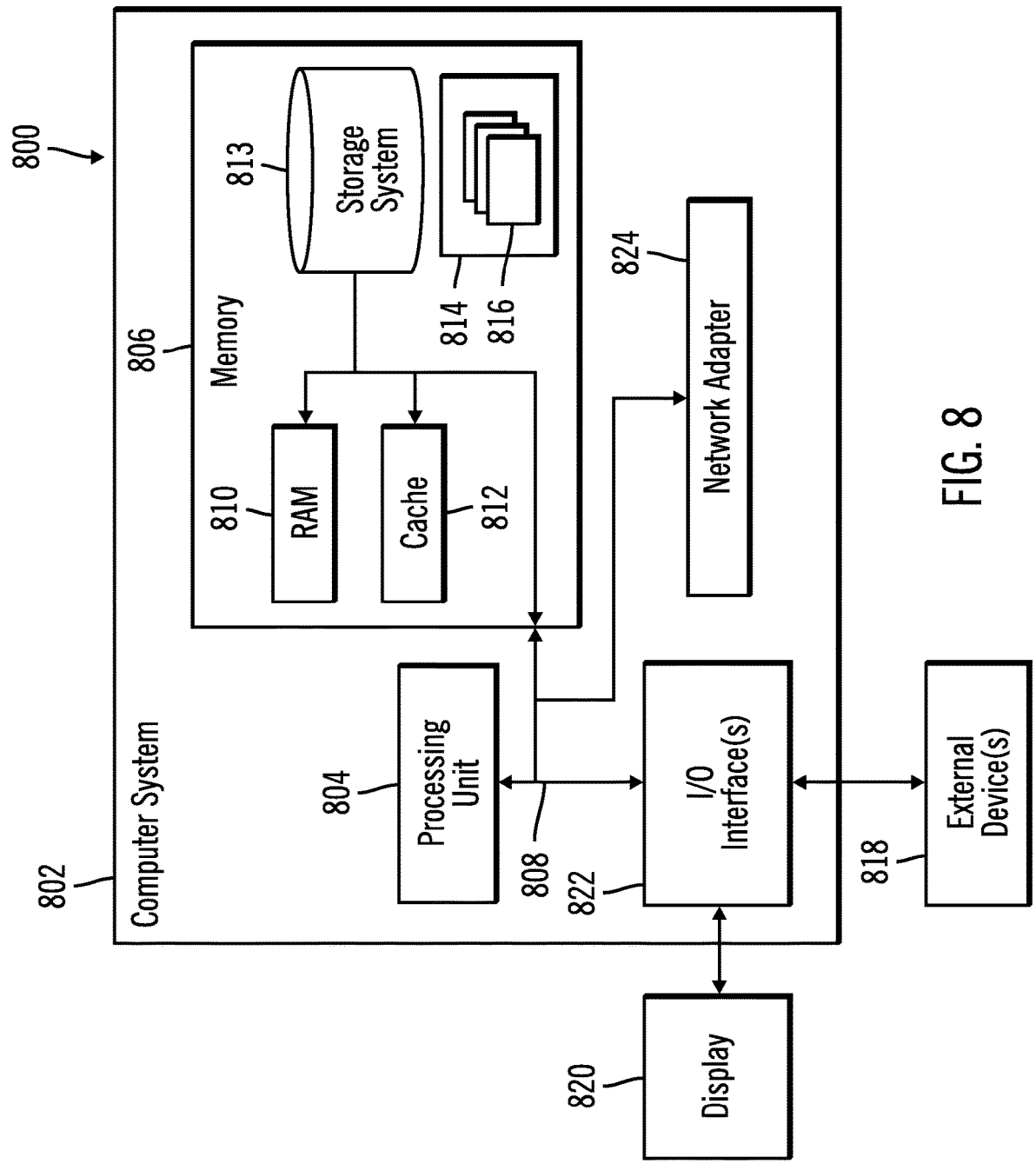
FIG. 8 illustrates a computing environment in which the components of FIG. 1 may be implemented.

The computational components of FIG. 1, including the storage controller 100 and subsystem 112 may be implemented in one or more computer systems, such as the computer system 802 shown in FIG. 8. Computer system/server 802 may be described in the general context of computer system executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system/server 802 is shown in the form of a general-purpose computing device. The components of computer system/server 802 may include, but are not limited to, one or more processors or processing units 804, a system memory 806, and a bus 808 that couples various system components including system memory 806 to processor 804. Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 806 can include computer system readable media in the form of volatile memory, such as random access memory (RAM) 810 and/or cache memory 812. Computer system/server 802 may further include other removable/non-removable, volatile/non-volatile computer system storage media. By way of example only, storage system 813 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 806 may include at least one program product having a set (e.g., at least one) of program modules that are configured to carry out the functions of embodiments of the invention.

Program/utility 814, having a set (at least one) of program modules 816, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. The components of the computer 802 may be implemented as program modules 816 which generally carry out the functions and/or methodologies of embodiments of the invention as described herein. The systems of FIG. 1 may be implemented in one or more computer systems 802, where if they are implemented in multiple computer systems 802, then the computer systems may communicate over a network.

Computer system/server 802 may also communicate with one or more external devices 818 such as a keyboard, a pointing device, a display 820, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 822. Still yet, computer system/server 802 can communicate with one or more networks such as a local area network (LAN), a general wide area network (WAN), and/or a public network (e.g., the Internet) via network adapter 824. As depicted, network adapter 824 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for queuing requests to stage and destage data between a cache and a storage device processed by a controller, the computer program product comprising a computer readable storage medium having computer readable program code embodied therein that is executable to perform operations, the operations comprising:

determining a priority for a request to stage a track from the storage device to the cache or to destage a track from the cache to the storage device, wherein the priority comprises a first priority or a second priority, wherein the first priority is higher than the second priority;

in response to the request having the second priority, performing:

determining whether a queue includes any dummy requests;

adding a first number of dummy requests to the queue in response to determining that the queue does not include any dummy requests; and adding a second number of dummy requests to the queue in response to determining that the queue includes dummy requests, wherein the second number is less than the first number, wherein the controller, upon processing a dummy request in the queue, discards the dummy request without performing an operation with respect to the storage device; and adding an I/O request having the second priority to the queue, wherein the controller, upon processing the I/O request, stages or destages data between the cache and the storage device.

2. The computer program product of claim 1, wherein the adding the I/O request to the queue comprises adding the I/O request to follow an added at least one dummy request in the queue.

3. The computer program product of claim 1, wherein the operations further comprise:

receiving a subsequent request to stage or destage data having the first priority;

determining whether there is a dummy request in the queue; and replacing the dummy request in the queue with the subsequent request in response to determining that the queue includes the dummy request.

4. The computer program product of claim 3, wherein the operations further comprise:

adding an I/O request to the queue for the subsequent request in response to determining that there is no dummy request in the queue.

5. The computer program product of claim 4, wherein the operations further comprise:

writing to a doorbell register in the controller to indicate to process the queue in response to the replacing the dummy request or adding the I/O request to the queue.

6. The computer program product of claim 1, wherein the second number is a function of the first number and a number of dummy requests in the queue.

7. The computer program product of claim 1, wherein the first priority comprises a high priority, wherein the first number of dummy requests is for the first priority, wherein the second number of dummy requests are added to the queue indicating a medium priority in response to the I/O request to stage or destage data having a low priority, wherein the medium priority is greater than the low priority and less than the high priority.

8. The computer program product of claim 7, wherein the operations further comprise:

adding dummy requests to the queue indicating the high priority in response to the I/O request to stage or destage data having the medium priority.

9. The computer program product of claim 7, wherein the operations further comprise:

receiving a subsequent request to stage or destage data having the high or the medium priority;

determining whether there is a dummy request in the queue for the high priority in response to the subsequent request having the high priority;

replacing the dummy request in the queue having the high priority with an I/O request having the high priority in response to determining that the queue includes the dummy request having the high priority;

determining whether there is a dummy request in the queue for the medium priority in response to the subsequent request having the medium priority; and replacing the dummy request in the queue with an I/O request having the medium priority in response to determining that the queue includes the dummy request having the medium priority.

10. A system for queuing requests to stage and destage data between a cache and a storage device processed by a controller, comprising:

at least one processor; and a computer readable storage medium having computer readable program code embodied that when executed by the at least one processor performs operations, the operations comprising:

determining a priority for a request to stage a track from the storage device to the cache or to destage a track from the cache to the storage device, wherein the priority comprises a first priority or a second priority, wherein the first priority is higher than the second priority;

in response to the request having the second priority, performing:

determining whether a queue includes any dummy requests;

adding a first number of dummy requests to the queue in response to determining that the queue does not include any dummy requests; and adding a second number of dummy requests to the queue in response to determining that the queue includes dummy requests, wherein the second number is less than the first number, wherein the controller, upon processing a dummy request in the queue discards the dummy request without performing an operation with respect to the storage device; and adding an I/O request having the second priority to the queue, wherein the controller, upon processing the I/O request stages or destages data between the cache and the storage device.

11. The system of claim 10, wherein the operations further comprise:

receiving a subsequent request to stage or destage data having the first priority;

determining whether there is a dummy request in the queue; and replacing the dummy request in the queue with the subsequent request in response to determining that the queue includes the dummy request.

12. The system of claim 10, wherein the first priority comprises a high priority, wherein the first number of dummy requests is for the first priority, wherein the second number of dummy requests added to the queue indicating a medium priority in response to the I/O request to stage or destage data having a low priority, wherein the medium priority is greater than the low priority and less than the high priority, wherein the first number is greater than the second number.

13. The system of claim 12, wherein the operations further comprise:

receiving a subsequent request to stage or destage data having the high or the medium priority;

determining whether there is a dummy request in the queue for the high priority in response to the subsequent request having the high priority;

replacing the dummy request in the queue having the high priority with an I/O request having the high priority in response to determining that the queue includes the dummy request having the high priority;

determining whether there is a dummy request in the queue for the medium priority in response to the subsequent request having the medium priority; and replacing the dummy request in the queue with an I/O request having the medium priority in response to determining that the queue includes the dummy request having the medium priority.

14. A method for queuing requests to stage and destage data between a cache and a storage device processed by a controller, comprising:

determining a priority for a request to stage a track from the storage device to the cache or to destage a track from the cache to the storage device, wherein the priority comprises a first priority or a second priority, wherein the first priority is higher than the second priority;

in response to the request having the second priority, performing:

determining whether a queue includes any dummy requests;

adding a first number of dummy requests to the queue in response to determining that the queue does not include any dummy requests; and adding a second number of dummy requests to the queue in response to determining that the queue includes dummy requests, wherein the second number is less than the first number, wherein the controller, upon processing a dummy request in the queue, discards the dummy request without performing an operation with respect to the storage device; and adding an I/O request having the second priority to the queue, wherein the controller, upon processing the I/O request, stages or destages data between the cache and the storage device.

15. The method of claim 14, further comprising:

receiving a subsequent request to stage or destage data having the first priority;

determining whether there is a dummy request in the queue; and replacing the dummy request in the queue with the subsequent request in response to determining that the queue includes the dummy request.

16. The method of claim 14, wherein the first priority comprises a high priority, wherein the first number of dummy requests is for the first priority, wherein the second number of dummy requests are added to the queue indicating a medium priority in response to the I/O request to stage or destage data having a low priority, wherein the medium priority is greater than the low priority and less than the high priority, wherein the first number is greater than the second number.

17. The method of claim 16, further comprising:

receiving a subsequent request to stage or destage data having the high or the medium priority;

determining whether there is a dummy request in the queue for the high priority in response to the subsequent request having the high priority;

replacing the dummy request in the queue having the high priority with an I/O request having the high priority in response to determining that the queue includes the dummy request having the high priority;
determining whether there is a dummy request in the queue for the medium priority in response to the subsequent request having the medium priority; and
replacing the dummy request in the queue with an I/O request having the medium priority in response to determining that the queue includes the dummy request having the medium priority.

\* \* \* \* \*